Figure 1:
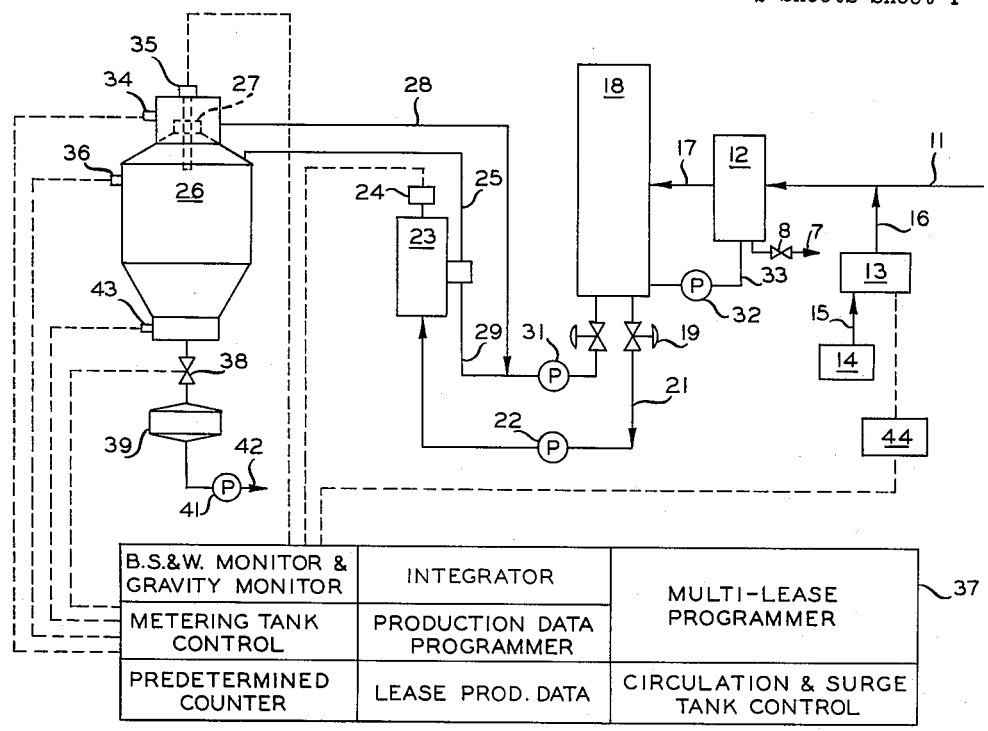

June 21, 1966    G. T. PORTER    3,256,902
AUTOMATIC CHEMICAL INJECTION CONTROL
Filed Oct. 30, 1961    2 Sheets-Sheet 1

INVENTOR.
G. T. PORTER
BY Young & Quigg
ATTORNEYS

June 21, 1966  G. T. PORTER  3,256,902
AUTOMATIC CHEMICAL INJECTION CONTROL
Filed Oct 30, 1961  2 Sheets-Sheet 2

INVENTOR.
G. T. PORTER
BY  Young & Quigg
ATTORNEYS

Patent text

3,256,902
AUTOMATIC CHEMICAL INJECTION CONTROL
Grady T. Porter, Bartlesville, Okla., assignor to Phillips Petroleum Company, a corporation of Delaware
Filed Oct. 30, 1961, Ser. No. 148,651
3 Claims. (Cl. 137—93)

The invention relates to method and apparatus for automatically controlling the injection of material into a process. In one aspect the invention relates to the manipulation of the rate of injection of a chemical treating agent into a fluid to be treated, responsive to a measured property of the fluid. In another aspect the invention relates to a method and apparatus for controlling the basic sediment and water (BS & W) content of an oil field produced fluid by manipulating the rate of injection of a chemical responsive to the BS & W content. In another aspect the invention relates to improved lease automatic custody transfer operations wherein the BS & W content of the transferred fluid is controlled by manipulating the rate of injection of a treating chemical automatically as a function of the BS & W content. In yet another aspect the invention relates to controlling the addition of material to a process responsive to a measured condition of the process. In a further aspect the invention relates to method and means for producing a gating signal of variable time duration. In a still further aspect the invention relates to an all-electrical system for controlling the BS & W content of a fluid.

Crude oil commonly is treated to remove the BS & W by pumping the oil to a treating tank in which it is mixed with a treating chemical and further processed, if necessary, as by raising the temperature and filtering. In lease automatic custody transfer operation a BS & W monitor has been used to measure the BS & W content, and, when the content is acceptable, the oil is pumped to a pipe line. If the BS & W content becomes too high, the oil is recycled to the treating tank for further treatment as noted above. This method often is inefficient. Since the object of the operation is to keep the BS & W content below a predetermined maximum at which the transfer operation will cease altogether there is a tendency to overtreat. That is, too much chemical is added, to be on the safe side, and the BS & W content of the oil often is much below the allowable value, which, for example, may be 0.5 percent. When this occurs, cost of the chemical treating agent is excessive.

It has now been found that it is desirable to provide an all-electric control system to control the injection of the chemical treating agent. According to the invention there are provided method and apparatus for controlling the BS & W content of an oil field produced fluid by measuring a property of the fluid which is representative of the BS & W content, producing a voltage signal proportional to the measured value of the property, adding a cyclic voltage to the voltage signal, and operating the injection pump only when the sum of the cyclic voltage and the signal voltage exceeds a predetermined value.

Accordingly, an object of the invention is to control the BS & W content of crude oil. Another object of the invention is to provide economical treatment with normal BS & W content and at the same time prevent exceeding the BS & W allowable value by manipulating the rate of treatment with change in the BS & W content. A further object of the invention is to provide improved oil field lease automatic custody transfer operation in which the BS & W content is automatically controlled. A still further object of the invention is to provide an all-electric system for controlling BS & W content of a fluid. Yet another object of the invention is to provide a gating signal of variable time duration. Another object of the invention is to control the addition of material to a process responsive to a measured condition of the process.

Other aspects, objects, and advantages of the invention will be apparent from a study of the disclosure, the drawing and the appended claims.

Figure 2:
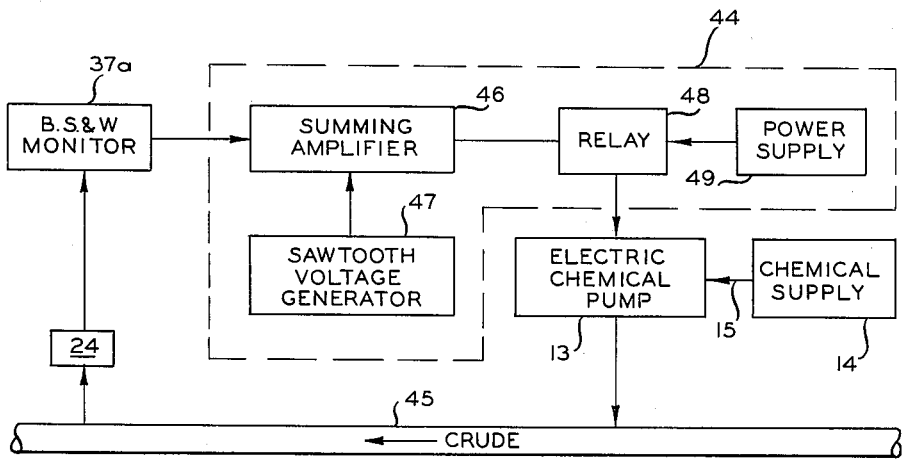
Figure 3:
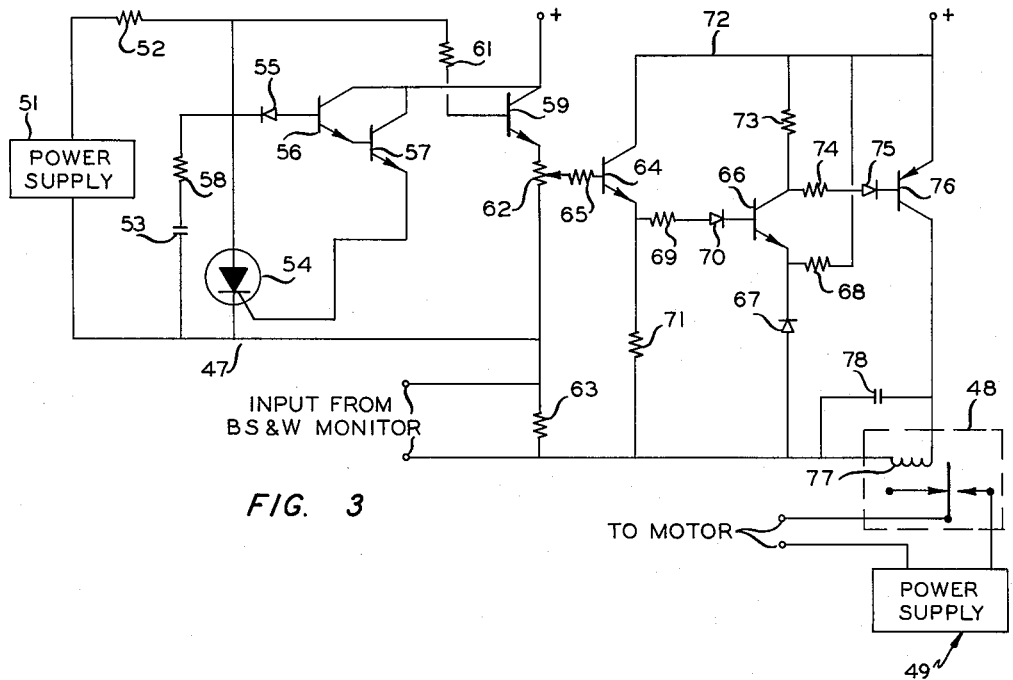
Figure 5:
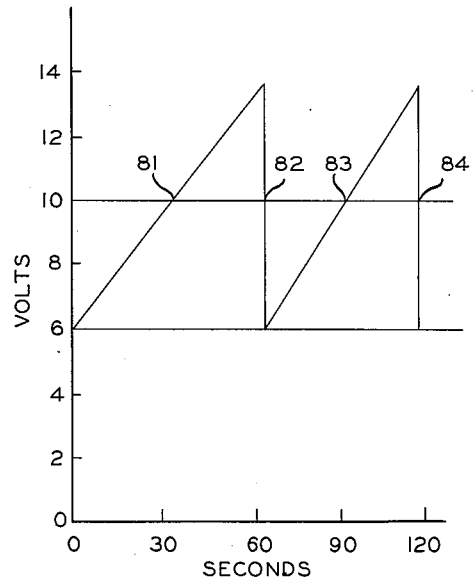
Figure 4:
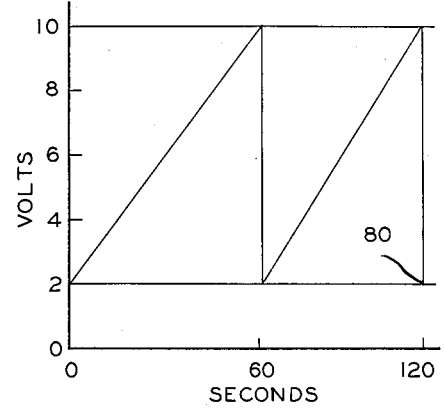

In the drawings FIGURE 1 is a schematic diagram of a lease automatic custody transfer system including the present invention; FIGURE 2 is a schematic block diagram of a BS & W control system according to the invention; FIGURE 3 is a schematic diagram of the electrical control system according to one embodiment of the invention; and FIGURES 4 and 5 are graphs illustrating the variations in the voltage versus time output of the electrical system of FIGURE 3.

Referring to the drawing and to FIGURE 1 in particular, the lease production flows through line 11 and into treater 12. An electrical chemical injection metering pump 13 is connected with a source 14 of treating chemical by means of feed line 15 and is adapted to supply metered quantities of the treating chemical into line 11 through injection line 16.

The treated oil from treating tank 12 passes through line 17 to surge tank 18. Line 7 containing valve 8 can be connected to the lower portion of treating tank 12 for removal of the separated BS & W. Oil from surge tank 18 flows through valve 19, transfer line 21, transfer pump 22, and through BS & W detector 23 which includes capacitance element 24. The oil then flows through line 25 into meter tank 26. Meter tank 26 is provided with an overflow weir 27, and below the level of weir 27 an overflow line 28. A monitor line 29 from BS & W detector 23 to surge tank 18 is provided with a monitor pump 31, and overflow line 28 connects with line 29 upstream of pump 31. Provision is made as shown, through circulating pump 32 and line 33, to recycle oil through treater 12 and back into surge tank 18.

Transfer pump 22 fills meter tank 26 with oil from surge tank 18 until the oil overflows weir 27 and thus wets level control 34. When this occurs transfer pump 22 stops and a read out cycle for specific gravity and temperature is begun. During this cycle signals from gravity probe 35 and temperature probe 36 are fed to control system 37. Following this read out period dump valve 38 opens to allow the oil from meter tank 36 to flow into pipe line sump 39 and to be transferred by pump 41 through pipe line 42. When lower level probe 43 is uncovered, the dump cycle stops and the fill cycle begins again.

During the time the oil is being transferred to meter tank 26, the oil flows continuously through BS & W detector 23 and a signal from this detector is transmitted to control system 37 which transmits a voltage proportional to the BS & W content to chemical injector control system 44. If at anytime the BS & W content exceeds a predetermined maximum, control system 37 actuates circulating pump 32 and opens the transfer pump circuit for the particular lease in operation. The variations in BS & W content are used to actuate control system 44 to vary the rate of the electrical chemical injection pump 13.

In FIGURE 2 there is shown a simplified block diagram of the BS & W control system wherein capacitance element 24 produces a signal representative of the BS & W content of the oil flowing in line 45. This signal is passed to BS & W monitor 37a, the output of which is then passed to summing amplifier 46. A suitable cyclic voltage such as a saw-tooth wave, is generated in voltage generator 47 and transmitted to summing amplifier 46 wherein it is added to the output of BS & W monitor 37a. When the sum exceeds a predetermined voltage, relay 48 is actuated to connect power supply 49 to electrical chemical pump 13. Thus the electrical chemical pump injects treating chemical from chemical supply 14 into line 45 only when the output of summing amplifier 46 exceeds a predetermined voltage.

In FIGURE 3 there is shown one embodiment of the electrical control system 44. A fixed time base saw-tooth voltage generator 47 comprises a source 51 of high voltage, a R-C time constant circuit including resistance 52 and capacitance 53, silicon controlled rectifier 54, a Zener diode 55, and transistors 56 and 57. In operation condenser 53 charges through resistor 52. The charging rate is essentially linear with time as the voltage across condenser 53 does not rise above a predetermined voltage, such as approximately 14 volts. When the voltage capacitance 53 reaches approximately 14 volts the Zener diode 55 starts conducting current to the base of transistor 56, which in turn applies current to the base of transistor 57. Transistors 56 and 57 are current amplifiers which amplify the small current through diode 55 sufficiently to cause the silicon controlled rectifier 54 to break down when the current from transistor 57 is fed to the gate of silicon controlled rectifier 54 before the current through diode 55 becomes large enough to appreciably slow down the charging rate of capacitor 53. Thus the current from transistor 57 causes the silicon controlled rectifier 54 to break down or start conducting. Once silicon controlled rectifier 54 starts conducting, it will act essentially as a short circuit to discharge condenser 53 through limiting resistor 58 and silicon controlled rectifier 54. When capacitance 53 starts discharging, diode 55 ceases conducting, and therefore the gate current to silicon controlled rectifier 54 stops flowing. The current through resistance 52 is not sufficient to hold silicon controlled rectifier 54 in its conducting state, so that when condenser 53 discharges to a certain point, which is approximately zero voltage, the current through controlled rectifier 54 drops below that value of current necesary to hold controlled rectifier 54 in its conducting state. Controlled rectifier 54 when stops conducting and capacitance 53 begins charging again. Transistor 59 is an emitter follower utilized to provide a low impedance output without loading the timing circuit. The base of transistor 59 is connected to one terminal of power supply 51 through resistors 52 and 61, while the emitter of transistor 59 is connected to the other terminal of power supply 51 through potentiometer 62.

The input circuit comprises a resistance 63, the voltage drop across which is added in series with a portion of the saw-tooth voltage from the saw-tooth generator 47. The input current flows essentially only through input resistance 63 and no appreciable current from the remainder of the circuit flows through resistance 63. Thus the input impedance is very nearly constant.

The sum of the input voltage across input resistance 63 and a saw-tooth voltage at the slider of potentiometer 62 is applied to the base of transistor 64 through resistance 65. The emitter of transistor 66 is biased with a suitable voltage, such as 9 volts, by Zener diode 67 and resistance 68. The emitter of transistor 64 is connected to the base of transistor 66 through a resistance 69 and a diode 70. The emitter of transistor 64 is also connected to one terminal of resistance 63 through a resistance 71. The collector of transistor 64 is connected to a suitable source of B+ voltage through line 72. The collector of transistor 66 is connected to the B+ voltage through a resistance 73. When the emitter of transistor 64 is below a predetermined voltage, such as 9 volts, transistor 66 does not conduct and diode 70 protects transistor 66 against damage from reverse base voltage. When the emitter of transmitter 64 rises above the predetermined voltage, base current flows in transistor 66 and its collector voltage falls. The collector of transistor 66 is connected through resistance 74 and diode 75 to the base of a transistor 76. When the collector voltage on transistor 66 decreases to a suitable value, such as 4.5 volts, below the B+ voltage, the Zener diode 75 breaks down and current flows in the base of transistor 76. When the base current flows in transistor 76, collector current also flows through coil 77, causing relay 48 to operate and connect power supply 49 in circuit with the motor of the electrical chemical pump 13. A capacitance 78 is connected in parallel with coil 77.

In FIGURES 4 and 5 there are shown typical voltage versus time curves of the sum of the input voltage from BS & W monitor and the saw-tooth voltage from saw-tooth generator 47. For purposes of illustration there is shown a saw-tooth wave having a peak value of 8 volts, and a voltage of at least 10 volts is required to actuate the relay 48 to energize the motor of the electrical chemical injection pump 13. Thus an input voltage from the BS & W monitor of only 2 volts, as shown by line 80 in FIGURE 4, is insufficient to cause the sum of the input voltage and the saw-tooth voltage to exceed the 10 volts required to actuate relay 48. An input vlotage from the BS & W monitor in the range of 2 to 10 volts is sufficient to cause the sum of the input voltage and the saw-tooth voltage to exceed 10 volts for a portion of the cycle of the saw-tooth wave. An input voltage in excess of 10 volts would cause the sum of the voltages to exceed 10 volts continuously and thus cause the motor to run continuously. A suitable time base, such as on the order of 60 seconds, is chosen for the saw-tooth wave. The time base should be sufficiently long as to permit efficient operation of the motor without adverse effects, and sufficiently short to permit rapid response to changes in the input voltage. Thus, as shown in FIGURE 5 the relay 48 is actuated to turn the motor on at point 81, to turn the motor off at point 82, to turn the motor on at point 83, to turn the motor off at point 84, and so on. Thus the amount of time during the cycle that the motor is actuated is directly dependent upon the input voltage, increasing from zero for an input voltage of 2 volts or less to continuous operation for an input voltage of 10 volts or greater.

Control system 44 can be designed to utilize any suitable current input such as ranges in the order of .5 to 2.5 milliamperes, 2 to 10 milliamperes, 5 to 25 milliamperes, and the like, depending on the value of the input resistance 63. Details of lease automatic custody transfer systems in which the invention can be utilized are given in Remke et al. U.S. 2,940,593, issued June 14, 1960, and the copending application by L. E. Kuntz entitled "Lease Automatic Custody Transfer," Serial No. 61,691, filed October 10, 1960, now U.S. Patent 3,107,526, and therefore the operation of these systems is described only in general terms in this application.

While the voltage generator 47 has been described as being a saw-tooth wave generator, it is within the scope of the invention to utilize generators of any suitable cyclic voltage, such as sine waves, triangular waves, and so on. However, the saw-tooth wave form is preferred. Thus the operation of the control system energizes the injection pump for a first period of time and deenergizes the injection pump for a second period of time, the ratio of the first period to the second period being a function of the process variable measured.

A suitable BS & W detector for use in this invention is disclosed in the copending applicaton by Kuntz Serial No. 686,192, filed September 25, 1957, now U.S. Patent 3,005,554, issued October 24, 1961. The various components which make up control system 37 and the various other elements of a complete automatic lease custody transfer system are shown in Kuntz, Serial No. 61,691, filed October 10, 1960, now U.S. Patent 3,107,526.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. Thus, an additional capacitor can be connected between the emitter and the collector of transistor 76 to aid in preventing contact chattering of relay 48; a resistor can be connected between the collector of transistor 76 and coil 77 to aid in preventing the coil from drawing excessive current; a resistor and a capacitor can be connected in series across the terminals of the power supply 49 to protect the contacts of relay 48; relay 48 can be replaced by two relays with the first relay actuating the second relay, thus permitting a larger load; while silicon control rectifier 54 as shown in FIGURE 3 can be a suitable type such as a 2N1596, a Transitron type TSW61S control switch which requires a much lower gate current can be utilized, thus permitting operation without gate current amplification and thus eliminating the necessity of transistors 56 and 57. Suffice to say, the drawing is for illustrative purposes, as is the description thereof.

Reasonable variation and modification are possible within the scope of the foregoing disclosure, the drawing, and the appended claims.

I claim:
1. Basic sediment and water control apparatus comprising in combination, a basic sediment and water detector including means for producing an electrical signal in proportion to the basic sediment and water content of a fluid, a summing amplifier, a saw-tooth voltage generator, means for feeding said signal to said amplifier, means for feeding the output of said generator to said amplifier and therein adding said output and said signal, chemical injection means for injecting treating chemical into said fluid, and means responsive to the output of said amplifier for actuating said chemical injection means during the time periods the output of said summing amplifier exceeds a predetermined value.

2. Basic sediment and water control apparatus comprising in combination a basic sediment and water detector including means for producing a voltage signal proportional to the basic sediment and water content, a summing amplifier, a saw-tooth voltage generator, an electrically actuated chemical injecting pump, a relay, a power supply, means for connecting the output of said saw-tooth voltage generator to a first input on said summing amplifier, means for feeding said voltage signal to a second input on said summing amplifier, means for operating said relay to a closed position during the time periods that the output of said summing amplifier exceeds a predetermined value, the switch of said relay being connected in series with said power supply and the electrical input terminals of said electrically actuated chemical injecting pump.

3. Apparatus for controlling a process wherein it is desired to add material, the quantity of which is a function of a property of the process, comprising means for measuring said property and producing a voltage signal proportional thereto, a summing amplifier, a saw-tooth voltage generator, an electrically actuated material injecting pump, a relay, an electrical power supply, means for connecting the output of said saw-tooth voltage generator to a first input on said summing amplifier, means for feeding said voltage signal to a second input on said summing amplifier, means connected to the output of said amplifier for operating said relay to a closed position during the time periods that the output of said summing amplifier exceeds a predetermined value, the switch of said relay being connected in series with said power supply and the electrical input terminals of said electrically actuated material injecting pump.

References Cited by the Examiner

UNITED STATES PATENTS

| | | | |
|---|---|---|---|
| 1,814,298 | 7/1931 | Dennhardt | 252—360 |
| 2,221,169 | 11/1940 | Raney et al. | 252—360 |
| 2,830,957 | 4/1958 | Rhodes | 252—328 |
| 2,940,593 | 6/1960 | Remke et al. | 210—84 |
| 2,996,676 | 8/1961 | Shawhan | 328—181 |
| 3,101,433 | 8/1963 | Miller et al. | 328—183 |
| 3,163,173 | 12/1964 | Kuntz | 252—360 |

OTHER REFERENCES

"Automatic Control," vol. 7–8, May 1958, pages 43–48.
Dow, U.S. Department of Commerce, Bureau of Mines Bulletin 250, "Oil Field Emulsions" (1926).

DELBERT E. GANTZ, *Primary Examiner.*

ALPHONSO D. SULLIVAN, DANIEL E. WYMAN,
*Examiners.*

M. H. SILVERSTEIN, P. P. GARVIN, H. LEVINE.
*Assistant Examiners.*